(12) United States Patent  
Coulmeau et al.

(10) Patent No.: US 7,835,825 B2  
(45) Date of Patent: Nov. 16, 2010

(54) METHOD FOR IMPROVING ROUTE AND 4D PREDICTION CALCULATIONS BY FMS FOR ATC TACTICAL INSTRUCTIONS

(75) Inventors: François Coulmeau, Seilh (FR); Guy Deker, Cugnaux (FR)

(73) Assignee: Thales (FR)

( * ) Notice: Subject to any disclaimer, the term of this patent is extended or adjusted under 35 U.S.C. 154(b) by 335 days.

(21) Appl. No.: 11/963,724

(22) Filed: Dec. 21, 2007

(65) Prior Publication Data

US 2008/0161982 A1 Jul. 3, 2008

(30) Foreign Application Priority Data

Dec. 21, 2006 (FR) .................................. 06 11207

(51) Int. Cl.  
*G01C 23/00* (2006.01)

(52) U.S. Cl. ............................... 701/3; 701/13; 701/14; 701/117; 701/120; 701/210; 244/158.1

(58) Field of Classification Search ............ 701/3, 701/4, 13, 14, 15, 16, 117, 120, 207, 210; 244/75.1, 158.1, 181

See application file for complete search history.

(56) References Cited

U.S. PATENT DOCUMENTS

2005/0049762 A1   3/2005   Dwyer

FOREIGN PATENT DOCUMENTS

WO   2005012837 A1   2/2005  
WO   2006040249 A1   4/2006

OTHER PUBLICATIONS

ARINC Advanced Flight Management Computer System, ARINC Characteristic 720A-2, Published Jun. 30, 2005 by Aeronautical Radio, Inc., Annapolis, Maryland, pp. 1-249.

*Primary Examiner*—Gertrude Arthur Jeanglaud  
(74) *Attorney, Agent, or Firm*—Lowe Hauptman Ham & Berner, LLP

(57) ABSTRACT

The subject of the present invention is a method for improving route and 4D prediction calculations by FMS in the framework of ATC tactical flight instructions, which method enables the FMS of an aircraft to carry out its usual predictions as precisely as possible when it has left or anticipates leaving its initial flight plan following an instruction from the air traffic controller, and has no instructions telling it where and when to return to the initial flight plan, and the invention is characterized in that it consists in transmitting to the aircraft, from an air traffic control centre, information enabling the FMS system to be aware of traffic crossing points (X1) and control sector changes, and to use this information to predict the coordinates of a point (X2) at which it is supposed to rejoin its initial flight plan at the earliest opportunity after the crossing point that required an alteration of trajectory and at the latest opportunity on the last point of the current sector.

11 Claims, 2 Drawing Sheets

METHOD FOR IMPROVING ROUTE AND 4D PREDICTION CALCULATIONS BY FMS FOR ATC TACTICAL INSTRUCTIONS

RELATED APPLICATIONS

The present application is based on, and claims priority from, French Application Number 06 11207, filed Dec. 21, 2006 the disclosure of which is hereby incorporated by reference herein in its entirety.

FIELD OF THE INVENTION

The present invention relates to a method for improving route and 4D (3D+time) prediction calculations by FMS in the framework of tactical flight instructions received from air traffic control centres and commonly known as "ATC tactical clearances".

BACKGROUND OF THE INVENTION

In the field of flight management systems (FMSs), the technical problem to be solved is related to the use by the ground of predictions calculated by the FMS along the flight plan (altitude, speed, fuel, time of passage, for each point on the flight plan). In recent studies, it emerged that a significant improvement in capacity and safety for future ATM (Air Traffic Management) systems lay on the one hand in the collaboration between the ground-based (ATC) and onboard (aircraft) operators, in particular the synchronization of route and flight data, and on the other hand in the deterministic predictability of the 4D situation of the traffic in the controlled air space.

The ground-based operators can use the predictions issued by aircraft to organize the traffic, smooth out the density of aircraft in each control sector, anticipate the dynamic control sector segmentations and groupings, sequence the aircraft more effectively in the terminal procedures, and lastly be able to deploy an end-to-end ATM system ("4D" and "Gate to Gate" concepts).

All these operations require both regular synchronization and precision in trajectory forecasts carried out on the ground and on board.

Current flight management systems (FMSs) provide for precisely calculating these predictions as long as the aircraft follows its flight plan. The problem lies in the quality of these predictions when the aircraft is no longer guided on the reference flight plan, in particular following a controller instruction urging it to temporarily leave its initial flight plan, and does not have instructions telling it where and when it can or must return to this initial flight plan. In this case, these are referred to as "tactical" instructions which are generally "open", i.e. without limitations in space or time.

This takes place in particular when the controller has to manage two types of scenario:
a potential conflict with another aircraft,
ensuring longitudinal separation with the preceding or following aircraft by extending or shortening the trajectory of the aircraft in order to land.

The controller then, using points, asks the aircraft to take a heading (most often the case, since this approach is the quickest to implement), or an altitude instruction, then returns the aircraft to its initial trajectory as soon as the nominal situation (separation) is restored. The controller can also issue a speed instruction for control purposes, but in very limited circumstances since this is not always possible (if the aeroplane is at the limits of its flight envelope), the execution takes time, is not very perceptible by the controller, and does not have a significant impact on the trajectory, and above all, this can cause delay in arrival.

In the vast majority of cases, the point-based trajectory modification is carried out within a single control sector, taking into account the LOA (Letter Of Agreement) which requires a sector A to transmit to an aircraft at a sector B at a given 3D point (position/altitude), and at a given speed.

Nevertheless, as long as the aircraft is held in "tactical mode", the FMS no longer knows how to correctly calculate the point at which it rejoins its initial flight plan, since it does not know when the tactical instruction will stop and enable it to return to the initial trajectory. By default, the predictions calculated by the aircraft assume that it rejoins the initial route immediately. In the 4D concept, these predictions are not precise enough and can disrupt all the traffic. Under these conditions, it is not possible to increase air space capacities as required by future capacity plans.

SUMMARY OF THE INVENTION

An object of the present invention is a method for improving route and 4D prediction calculations by FMS in the framework of ATC tactical flight instructions, which method enables the FMS of an aircraft to carry out its usual predictions as precisely as possible when it has left or anticipates leaving its initial flight plan following an instruction, current or anticipated, from the air traffic controller, and has no instructions telling it where and when to return to the initial flight plan.

The method according to the invention is characterized in that it consists in transmitting to the aircraft information enabling the FMS system to be aware of traffic crossing points and control sector changes, and to use this information to predict the coordinates of a point at which it is supposed to rejoin its initial flight plan at the earliest opportunity after the crossing point that required an alteration of trajectory and at the latest opportunity on the last point of the current sector. Given the size of control sectors, this system ensures more reliable predictions than before.

According to one feature of the invention, when the route of another aircraft, passing through the traffic crossing point, is known, as long as the aircraft has not crossed this route, the FMS calculates a route from the aircraft to a point where the aircraft crosses said route while maintaining its heading, followed by a route intercepting its initial route to intercept the latter at a convergence point located on its initial route.

According to another feature of the invention, the convergence point is a point on the initial flight plan, or a limit transition point calculated between the current sector and the next sector.

According to another feature of the invention, the initial route is intercepted with a nominal convergence angle of about 45°, or with a nominal convergence angle having a value that is dependent on the procedure flown.

According to another feature of the invention, when the point of interception with the initial route is located outside the sector in which the aircraft is located, this initial route is intercepted with a convergence angle that is greater than the nominal convergence angle.

According to another feature of the invention, when the route of another aircraft is known and when the aircraft in question has crossed the point that crosses this route, but has still not received instructions to return to the initial flight plan, its FMS considers that the aircraft will continue on its heading until it can take the nominal convergence heading towards a point on the initial flight plan, located at the exit of the sector in which it is located.

According to another feature of the invention, when the route of another aircraft is not known, the FMS of the aircraft in question directly calculates a point, extrapolated from the point that crosses this route at a constant selected heading, for which the aircraft can return to intercept its initial route in order that interception with the initial route at the nominal convergence angle takes place.

According to another feature of the invention, the convergence point is a transition point on the initial flight plan, or a limit point between the current sector and the next sector.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The invention is described below with reference to the receipt of digital tactical clearances, transmitted via a data link (called CPDLC), but it is clearly understood that the invention can also be implemented in the case of voice clearances, provided that the corresponding CPDLC messages can be selected by the crew and transmitted to the FMS, and in that case, the FMS system detects the heading, altitude and speed instructions inputted directly by the autopilot (instructions referred to as "selected"). However, for an entirely manually controlled flight, this system is less applicable since the intentions of the pilot are difficult for an onboard system to interpret. In that case, other assumptions are made, such as an immediate return to the flight plan (current assumption) still nevertheless taking into account in the predictions a nominal rejoin at about 45° (or less depending on the requirement).

Figure 1:
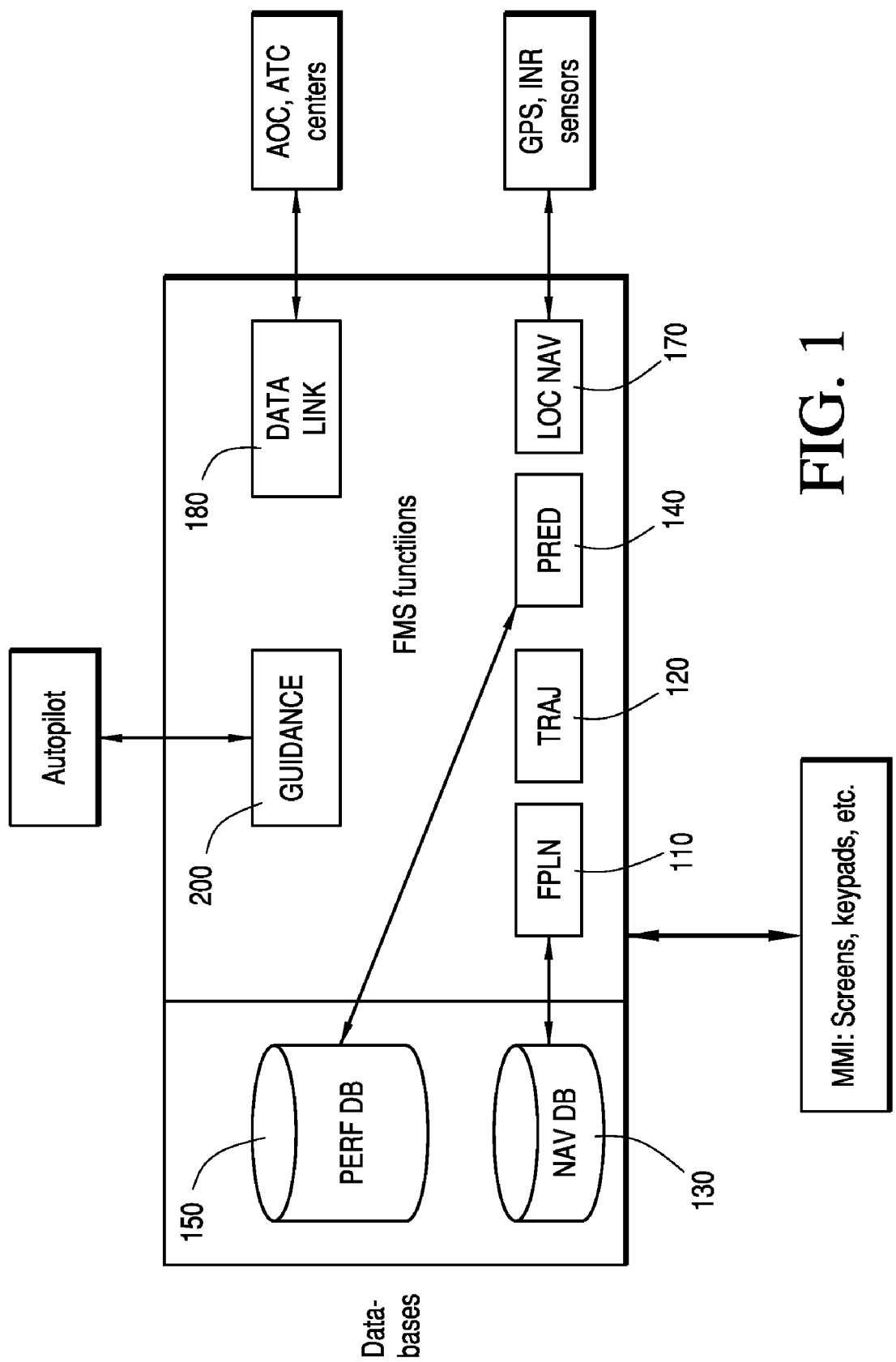
FIG. 1 is a simplified block diagram of a conventional flight management system (FMS) to which the invention is applied.

In the simplified block diagram in FIG. 1 of a conventional aircraft flight management device (called an FMS), which is equipped with a man-machine interface MMI, the following functions of the FMS are represented, as described in the ARINC 702 standard (Advanced Flight Management Computer System, December 1996). They normally provide all or some of the following functions:

❖Navigation LOCNAV, labelled 1, for optimally locating the aircraft as a function of the geolocating means (GPS, Galileo, VHF radio beacons, inertial units; labelled 1A in their entirety);

❖Flight plan FPLN, labelled 2, to input the geographic items forming the skeleton of the route to be followed, i.e. departure and arrival procedures, waypoints, airways;

❖Navigation database NAV DB, labelled 3, for constructing geographic routes and procedures based on data contained in the databases (points, beacons, interception or altitude legs, etc.);

❖Performance database PRF DB, labelled 4, containing aerodynamic parameters and those of the aircraft engines;

❖Lateral trajectory TRAJ, labelled 5, for constructing a continuous trajectory based on points on the flight plan, observing the performance levels of the aircraft and the confinement constraints (RNP);

❖Prediction function PRED, labelled 6, for constructing a vertical profile optimized on the lateral trajectory;

❖Guidance GUID, labelled 7, for guiding, in the lateral and vertical planes, the aircraft on its 3D trajectory, while optimizing the speed, in conjunction with the autopilot 8;

❖Digital data link DATALINK, labelled 9, for communicating with the control centres and other aircraft, labelled 10.

"Tactical" clearances, which make the aircraft leave its flight plan, and as defined by international standards (ICAO ATN SARPs) are, for example:

UM94—TURN [direction] HEADING [degrees]
UM95—TURN [direction] GROUND TRACK [degrees]
UM96—CONTINUE PRESENT HEADING
UM98—IMMEDIATELY TURN [direction] HEADING [degrees]
UM190—FLY HEADING [degrees]
UM215—TURN [direction] [degrees]
UM221—STOP TURN HEADING [degrees]

The present invention describes the use of this type of clearance, it being understood that the example in question does not prejudge the wider scope of the invention. On receiving a digital tactical clearance from the ATC centre (which clearance is received by the DATALINK block 9 of the FMS), the FMS modifies the flight plan (FPLN function labelled 2) to take into account the clearance.

Figure 2:
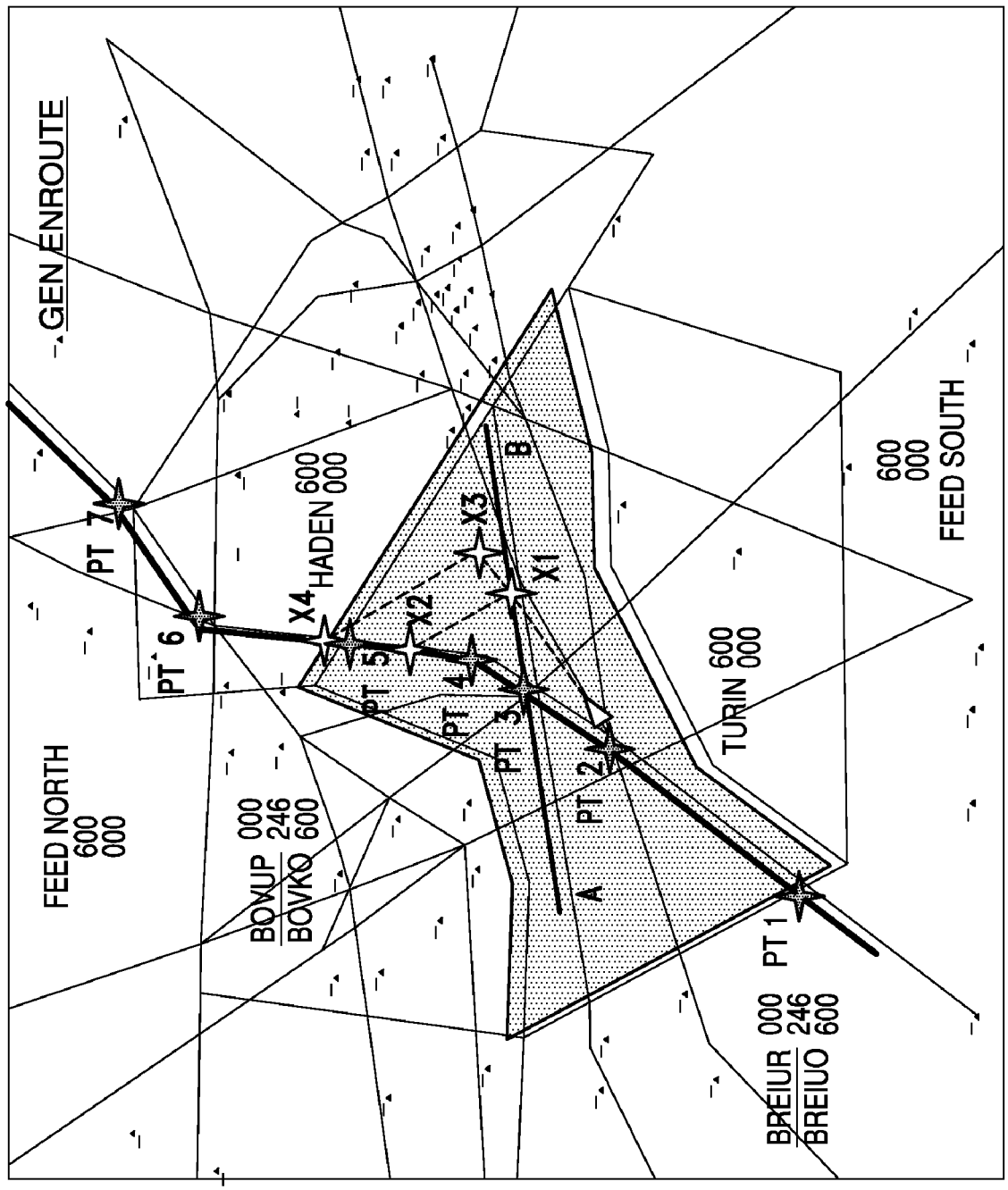
FIG. 2 is an example flight plan for explaining how the method of the invention is implemented.

At the same time, the FMS is aware of the geometry of the sectors (transmitted in the form of polygons), an example of which is represented in FIG. 2, and can therefore determine the strategic points of the sector on its route (crossing points of the air routes PT2, PT3 and PT4, and point PT5 of transition between the current sector and the next one according to the LOA).

In FIG. 2, the flight plan of the aircraft is indicated as a thick black line. The passage points are symbolized by crosses labelled PT1 to PT5. The borders between sectors are labelled 11 and the aircraft is represented by a triangle labelled 12. The current flight plan (just before the tactical clearance is received) is PT2 (FROM), PT3 (TO), PT4, PT5, PT6, PT7, i.e. the aircraft is hence located at the point PT2 and its next passage point is PT3, the subsequent ones being PT4 to PT7.

FIG. 2 represents the moment when the aircraft 12 was made to leave the flight plan by ATC, via an instruction to take on a heading at the point PT2, due to a crossing of the route at the point PT3. The FMS will consider, for calculating the trajectory used to support the predictions, the following process:

1. When the route AB of another aircraft, passing through the crossing point PT3, is known, as long as the aircraft 12 has not crossed this route, the FMS calculates a route Aircraft-X1 (point where the aircraft crosses the route AB while maintaining its heading), followed by a route X1-X2 intercepting its initial route at a nominal angle of about 45° (for example, this angle being a conventional rejoin value in civil aviation but can be adapted according to the procedure to be flown), then a resumption of the initial route from X2 (where X2 is the point on the flight plan where it rejoins the initial route). When the point of interception, at about 45°, with the initial route is located outside the sector in which the aircraft 12 is located, this initial route will be intercepted with a convergence angle that is greater than about 45°, enabling the aircraft 12 to rejoin the point of transition towards the next sector (point PT5 in the drawing, in the current sector), or when there is no transition point, the limit point (point X4 in the drawing) between the two sectors is considered.

2. When the route AB is known and when the aircraft 12 has crossed the point X1 but has still not received instructions to return to the initial flight plan, its FMS considers that the aircraft will continue on its heading until it can take a heading of convergence, at about 45°, towards a point on the initial flight plan located, at the furthest, at the exit of the sector in which it is located (specifically, in consideration of the letters of agreement between sectors, the passages from one sector to another are created on pre-established points of passage. There is therefore a high probability that the controller of the current sector will manage the conflict and will make the aircraft return to its route before it leaves his sector). To this end, the FMS calculates the segment X1-X3, where X3 is a point, extrapolated from X1 at a constant selected heading, for which the aircraft can return to intercept the initial route. This point of interception with the initial route is calculated so as to enable the aircraft to rejoin the initial route at the point PT5 at an angle of about 45°, the point PT5 being the point of transition towards the next sector; or if there is no transition point, the point X4 will come into play, at the border between the two control sectors.

3. Lastly, when the route AB is not known, the FMS directly calculates this point X3 in order that an interception occurs, at about 45°, with its initial route at the end of the current sector, or at the sector transition point PT5 (as for the assumption 2 above).

It will be noted that the transition point (corresponding to the letter of agreement between the sectors) is known today and used on the ground but is not supplied to aircraft (not useful for navigation purposes). This crossing point is therefore advantageously retrieved later on board (either via an uplink, or extracted from a database).

Advantageously, when X2 or X3 is determined, the current flight plan is cleaned, which involves removing the points upstream of X2 (PT3 and PT4).

The points X1, X2, or X1, X2 and X3, are added to the FMS flight plan which becomes:

❖On the one hand: FROM, X1, X2, PT5, PT6, PT7, etc.

❖Then, on the other hand, if the aircraft does not take on a convergence heading at X1 associated with an authorization from the ATC to rejoin its initial route: FROM, X1, X3, PT5 (or X4), PT6, PT7, etc.

The predictions calculated by the FMS of the aircraft 12 will be applied to this new flight plan.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. A method of generating an alternative route for an aircraft by a flight management system (FMS) of the aircraft, comprising:

receiving information transmitted from at least one air traffic control center that enables the FMS to be aware of a current control sector and an initial route within the current control sector;

receiving an instruction transmitted from the at least one air traffic control center instructing the aircraft to deviate from the initial route at a first crossing point on the initial route;

determining a second crossing point where the aircraft should start moving toward the initial route; and determining a convergence point on the initial route that allows the aircraft to intercept the initial route before leaving the current control sector.

2. The method according to claim 1, wherein the aircraft is instructed to deviate the initial route by taking a heading, and the second crossing point is the point on a route of another aircraft where the aircraft will cross if maintaining the heading, and a route determined by the second crossing point and the convergence point allows the aircraft to intercept the initial route at an angle no less than a nominal convergence angle.

3. The method according to claim 2, wherein the initial route is defined by a plurality of strategic points, and the convergence point is one of the plurality of strategic points.

4. The method according to claim 2, wherein the convergence point is a limit point between the current control sector and a next control sector.

5. The method according to claim 2, wherein the initial route is intercepted with the nominal convergence angle of about 45°.

6. The method according to claim 2, wherein the initial route is intercepted with the nominal convergence angle having a value that is dependent on a procedure flown by the aircraft.

7. The method according to claim 2, wherein the initial route is intercepted with the angle that is greater than the nominal convergence angle if the convergence point will not be located within the current control sector provided the nominal convergence angle being followed.

8. The method according to claim 1, wherein the aircraft is instructed to deviate the initial route by taking a heading, and the second crossing point is a point extrapolated from the first crossing point at the heading and allows the aircraft to intercept the initial route at a nominal convergence angle when a route of another aircraft is known and when the aircraft has crossed the route of the another aircraft but has still not received instructions to return to the initial route from the at least one air traffic control center.

9. The method according to claim 1, wherein the aircraft is instructed to deviate the initial route by taking a heading, and the second crossing point is a point extrapolated from the first crossing point at the heading and allows the aircraft to intercept the initial route at a nominal convergence angle when a route of another aircraft is not known.

10. The method according to claim 9, wherein the initial route is defined by a plurality of strategic points including a transition point from the current control sector toward a next control sector, and the convergence point is the transition point.

11. The method according to claim 9, wherein the convergence point is a limit between the current control sector and the next control sector.

* * * * *